United States Patent
Anisimov et al.

(10) Patent No.: US 7,792,254 B2
(45) Date of Patent: Sep. 7, 2010

(54) SYSTEM FOR DISTRIBUTING VXML CAPABILITIES FOR EXECUTION ON CLIENT DEVICES

(75) Inventors: Nikolay Anisimov, Concord, CA (US); Petr Makagon, San Francisco, CA (US); Herbert Willi Artur Ristock, Walnut Creek, CA (US); Andrey Ryabchun, San Francisco, CA (US); Michael Perlmutter, San Francisco, CA (US); Dan Kikinis, Saratoga, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 1320 days.

(21) Appl. No.: 11/003,723

(22) Filed: Dec. 2, 2004

(65) Prior Publication Data

US 2006/0083362 A1  Apr. 20, 2006

Related U.S. Application Data

(60) Provisional application No. 60/620,378, filed on Oct. 19, 2004.

(51) Int. Cl.
*H04M 1/64* (2006.01)

(52) U.S. Cl. .............................. 379/88.17; 379/201.12; 379/221.09

(58) Field of Classification Search .............. 455/414.1, 455/563, 566; 379/88.17, 88.13, 88.11, 221.09, 379/15.03, 201.12
See application file for complete search history.

(56) References Cited

U.S. PATENT DOCUMENTS

| | | | |
|---|---|---|---|
| 6,424,945 B1 | 7/2002 | Sorsa et al. | |
| 6,662,163 B1 | 12/2003 | Albayrak et al. | |
| 6,687,341 B1 | 2/2004 | Koch et al. | |
| 2002/0065944 A1 | 5/2002 | Hickey et al. | |
| 2003/0005076 A1* | 1/2003 | Koch et al. | 709/217 |
| 2003/0078775 A1 | 4/2003 | Plude et al. | |
| 2003/0202504 A1* | 10/2003 | Dhara et al. | 370/352 |
| 2003/0233239 A1 | 12/2003 | Creamer et al. | |
| 2004/0121814 A1* | 6/2004 | Creamer et al. | 455/563 |
| 2005/0147217 A1* | 7/2005 | Ahonen | 379/88.17 |
| 2006/0084478 A1* | 4/2006 | Erlichmen | 455/566 |
| 2007/0291924 A1* | 12/2007 | Matula | 379/265.09 |

OTHER PUBLICATIONS

U.S. Appl. No. 60/620,378, Nikolay Anisimov et al.

* cited by examiner

*Primary Examiner*—Olisa Anwah
(74) *Attorney, Agent, or Firm*—Central Coast Patent Agency, Inc.

(57) ABSTRACT

A system for interacting with voice extensible markup language application content includes a content source node connected to a network for rendering availability of voice extensible markup language content and code; a communication device connected to the network for acquiring at least the code rendered available; and a software interface running on the communication device for determining local existence of at least the code acquired and initializing execution of found code. Upon code execution, the content may be played on the communication device without a persistent network connection to the enterprise hosting the content.

18 Claims, 4 Drawing Sheets

SYSTEM FOR DISTRIBUTING VXML CAPABILITIES FOR EXECUTION ON CLIENT DEVICES

CROSS-REFERENCE TO RELATED DOCUMENTS

The present application claims priority to provisional patent application Ser. No. 60/620,378 filed on Oct. 19, 2004. Provisional patent application Ser. No. 60/620,378 is hereby incorporated in its entirety by reference.

BACKGROUND OF THE INVENTION

Field of the Invention

The present invention is in the field of telephony communication including interactive voice and voice extensible markup language (VXML) call processing and pertains particularly to methods and apparatus for distributing VXML functionality for execution on client devices.

In state-of-art telephony communications computer telephony integrated (CTI) contact centers are improving call handling efficiency by implementing more voice-based self service systems that intercept incoming calls and route those calls according to voice iteration by the caller. In some cases, voice applications are provided that may entirely handle calls to termination without those calls requiring live interface with a center agent. One voice-based interactive method uses voice extensible markup language (VXML) to provide interaction, typically through a VXML gateway into the contact center. A VXML gateway is typically enhanced with automatic speech recognition (ASR) capabilities and text to speech (TTS) capabilities and functions to recognize spoken voice of a caller using the iteration as a command to provide a synthesized (TTS) or a pre-recorded digital response to the caller.

VXML may be integrated to work Web-based service interfaces or traditional connection oriented switched telephony (COST) interfaces or a combination of interfaces. This fact has led many enterprises to implement one or more VXML enhanced gateways as important if not primary caller interfaces into the contact center. In this way callers may be pre-routed and screened to determine what their exact needs are and how they may be best served.

Figure 1:
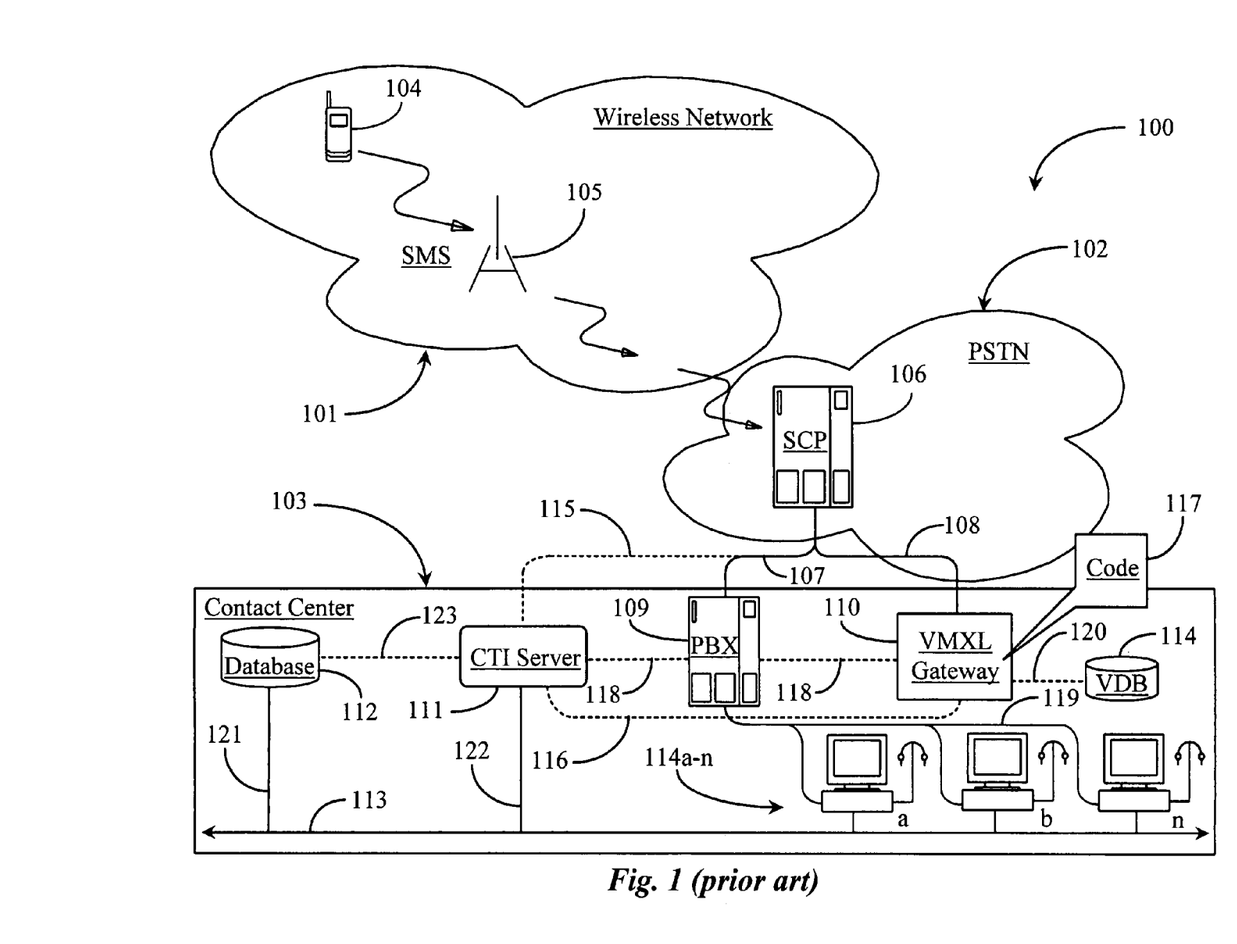
FIG. 1 is an exemplary overview of a VXML-enhanced communication environment according to prior-art.

An exemplary architecture for practicing VXML call intercept and processing is illustrated in FIG. 1 of this specification. FIG. 1 is an exemplary overview of a communications environment 100 enhanced for VXML caller processing according to prior-art.

Referring now to FIG. 1, communications environment 100 includes a wireless telephony network 101, a public switched telephony network (PSTN) 102, and a contact center 103 adapted to service callers. Wireless network 101 may be proprietary to one or more cooperating wireless service providers and may include both conventional cellular services and Internet access services. A wireless tower 105, typically there will be many in a region, functions to intercept a wireless transmission from, in this case cellular telephone 104, and forward the transmission on toward it's destination. In this case, a wireless call initiated from cell phone 104 is assumed destined to contact center 103.

PSTN network 102 has a service control point (SCP) 106 illustrated therein, which in this case, is adapted to receive the call from 104 and to perform some processing related to the call based on information provided with the call and other connection-related information. SCP 106 may be CTI-enhanced to perform some pre-routing routines and may make limited decisions about final call destination determination.

In this case, SCP 106 makes a decision based on call data including destination number information indicative that the caller is trying to reach contact center 103. The decision made in this case by SCP 106 is whether to route the call to a private branch exchange (PBX) switch illustrated within contact center 103 as PBX 109, or to route the call to a VXML gateway illustrated within contact center 103 as VXML gateway 110. SCP 106 has telephony connection to PBX 109 via a trunk 107 and to VXML gateway 110 via a trunk 108. In some cases, VXML gateway 110 might be a default routing destination for SCP 106 whereby VXML gateway 110 interacts with the incoming calls to determine if any will be routed to PBX 109 for live connection to an agent.

Contact center 103 is CTI-enhanced with a CTI processor 111 that has access to an enterprise database 112. CTI server 111 provides some intelligence to both PBX 109, should it receive the call, and to VXML gateway 110, should it receive the call. Either system PBX 109 or VXML 110 may further route the call if necessary. For purposes of description, it is noted herein that the only connection between PSTN 102 and contact center 103 is trunks 107 and 108. Therefore call data may be routed over these trunks depending on SCP pre-routing decision, while call control data may be provided (logically) to CTI server 111 via a logical link 115 for further routing and call control functions.

In typical practice, if the call from cell 104 is routed to PBX 109, it may then be further routed to any one of live agents 114 a-n for call disposition. If the call from cell 104 is routed to VXML gateway 110, a voice interaction occurs between the caller and executable code 117 contained within gateway 110. The code 117 is typically in the form of a voice application that has a menu and a hierarchical tree of options for the caller to select from during the interaction. In most cases, as is the goal of the hosting enterprise, calls to VXML gateway 110 are handled without further routing using the voice application code 117. However, further routing may be determined by gateway 110 such as transfer to PBX 109 for routing to a live agent.

Therefore, VXML gateway 110 functions to take call handling load off of live agents 114 a-n when callers may be services through automated means using no live agent. In this way the agent's time is better utilized to service those callers who really require live service.

VXML gateway helps to share call load in this case, but there may be heavy calling periods wherein both PBX 109 and VXML gateway 110 are receiving the maximum number of calls routed from SCP over trunks 107 and 108 respectively. Therefore, the connection between SCP 106 and contact center 103 may represent a bottleneck causing many calls to be dropped at SCP 106.

Therefore, what is needed in the art is a method and system for distributing some of VXML capabilities to client devices for off-site processing.

SUMMARY OF THE INVENTION

According to embodiments of the present invention, a system is provided for interacting with voice extensible markup language application content. The system includes a content source node connected to a network for rendering availability of voice extensible markup language content and code; a communication device connected to the network for acquiring at least the code rendered available; and a software interface running on the communication device for determining local existence of at least the code acquired and initializing execution of found code.

In a preferred embodiment, the network is a communication network including a wireless network, a telephony network, and the Internet network and the content source node is a voice extensible markup language (VXML) gateway. Also in a preferred embodiment, the communication device is a cellular telephone. In one embodiment, the communication device is an Internet protocol telephone. In one embodiment, the software instance includes a contact list directory.

In a preferred embodiment, the content source node is enhanced for computer telephony integration (CTI). In this embodiment, the content source node is a VXML gateway and is further connected to a telephony switch and to a CTI server for combined functionality in servicing calls incoming to a contact center. In a variation of this embodiment, a service control point in the telephony network first services the incoming calls.

According to another aspect of the present invention, in a system for interacting with VXML application content, the system including a content source node, a communication device, and a software interface running on the communication device, a method for acquiring and executing VXML code for offsite local interaction is provided. The method includes steps for; (a) selecting a telephone contact number from a contact list available to the communication device; (b) dialing the contact number; (c) establishing a connection between the communication device and a service point servicing the destination of the number; (d) determining at the service point the presence of voice extensible markup language capability associated with the destination number dialed; (e) forwarding a request from the service point to the content source node, the request to render the code associated with the destination number available to the caller; (f) forwarding the code to the communication device; and (g) executing the code from the communication device.

In a preferred aspect of the method in step (a), the communication device is one of a cellular telephone. Also in a preferred aspect, in step (c), the connection established is a wireless connection from the point of the communication device and the service point is a service control point in a PSTN network.

In one aspect in step (d), the presence determination points to at least one VXML executable code set stored at the content source node and associated with the destination number. In one aspect in step (e), the request is of the form of call control data formatted as a command including description of media channel to be used in rendering.

In one aspect in step (f), the code is sent as a message attachment to the caller over a data connection. In another aspect in step (f), the code is delivered to a specified inbox maintained by the caller. In still another aspect in step (f), a link to the code is delivered to the caller in one of an instant message, a simple messaging service message, or in an electronic mail message. In yet another aspect in step (f), the code is delivered transparently to the communication device over an Internet connection.

According to yet another aspect of the present invention, in a system for interacting with VXML application content, the system including a content source node, a communication device, and a software interface running on the communication device, a method for interacting with application content offsite is provided. The method includes steps for (a) selecting a telephone contact number from a contact list available to the communication device; (b) determining the presence of locally stored voice extensible markup language code associated with the selected contact number; (c) executing the code; and (d) interacting with content played by the code.

In a preferred aspect in step (a), the communication device is one of a cellular telephone. In this aspect in step (b), the method of association is a pointer to a database entry in a local database. In a preferred aspect the communication device executes the code automatically.

In one aspect of the invention, in step (a), a simultaneous step for dialing the number is initiated. In one aspect in step (d), the content is text that is rendered on the communication device as synthesized voice using text to speech technology.

In one aspect in step (e) the content is pre-recorded audio stored on the communication device. In another aspect, in step (d), the content is stored in a repository accessible to the communication device on a local network. In still another aspect in step (d), the content is stored in a repository accessible to the communication device on a wide area network.

DESCRIPTION OF THE PREFERRED EMBODIMENTS

FIG. 1 is an exemplary overview 100 of a VXML-enhanced communication environment according to prior-art. Overview 100 includes wireless network 101, PSTN network 102, and contact center 103 and was much described further above with respect to the background section of this specification. SCP 106 routes incoming calls over trunks 107 and 108 to PBX 109 and VXML gateway 110 respectively. Call control data is routed primarily to CTI server 111 over logical link 115.

Agents 114a-n within center 103 are connected to a local area network (LAN) 113 for data communication and to PBX 109 via telephony wiring 119 for telephone communication. It is noted herein that logical link 115 provides call control data to CTI server 111, which also has a LAN connection 122. CTI server 111 has a data link 123 to enterprise database 112, which also has a LAN connection 121. CTI server 111 has control access to PBX 109 over CTI link 118 and control access to VXML gateway 110 over CTI link 1116. VXML gateway 110 has a link 120 to a voice database (VDB) 114, which is adapted to contain voice applications and, in some cases pre-recorded voice-based resources like wav files for example.

In practice of current art there may be other known architectures using alternate connections and host machinery. This example serves as a simple rendition of a typical architecture where VXML call handling is present. Agents 114 a-n may use telephones to interact with PBX 109 wherein if a call must be transferred from VXML gateway 110, it will be handled by PBX 109 and be routed to one of agents 114a-n over wiring 119. Headsets next to each station represent standard telephony capabilities. In some cases known to the inventor IP-capable headsets may be provided and stations 114a-n may have a LAN-based connection to the well-known Internet network through a router though none is illustrated in this example.

The bottleneck described above with reference to telephony trunks 107 and 108, the only path between the center and the network, may cause many calls destined for center 103 to be dropped at the level of SCP 106 or these calls may be queued for unreasonable periods causing customer exasperation while waiting for an agent or for automated help. Therefore, the inventor provides a system and method that may aid the problem illustrated in this example through distribution of VXML capabilities as will be described in enabling detail below according to embodiments of the present invention.

Figure 2:
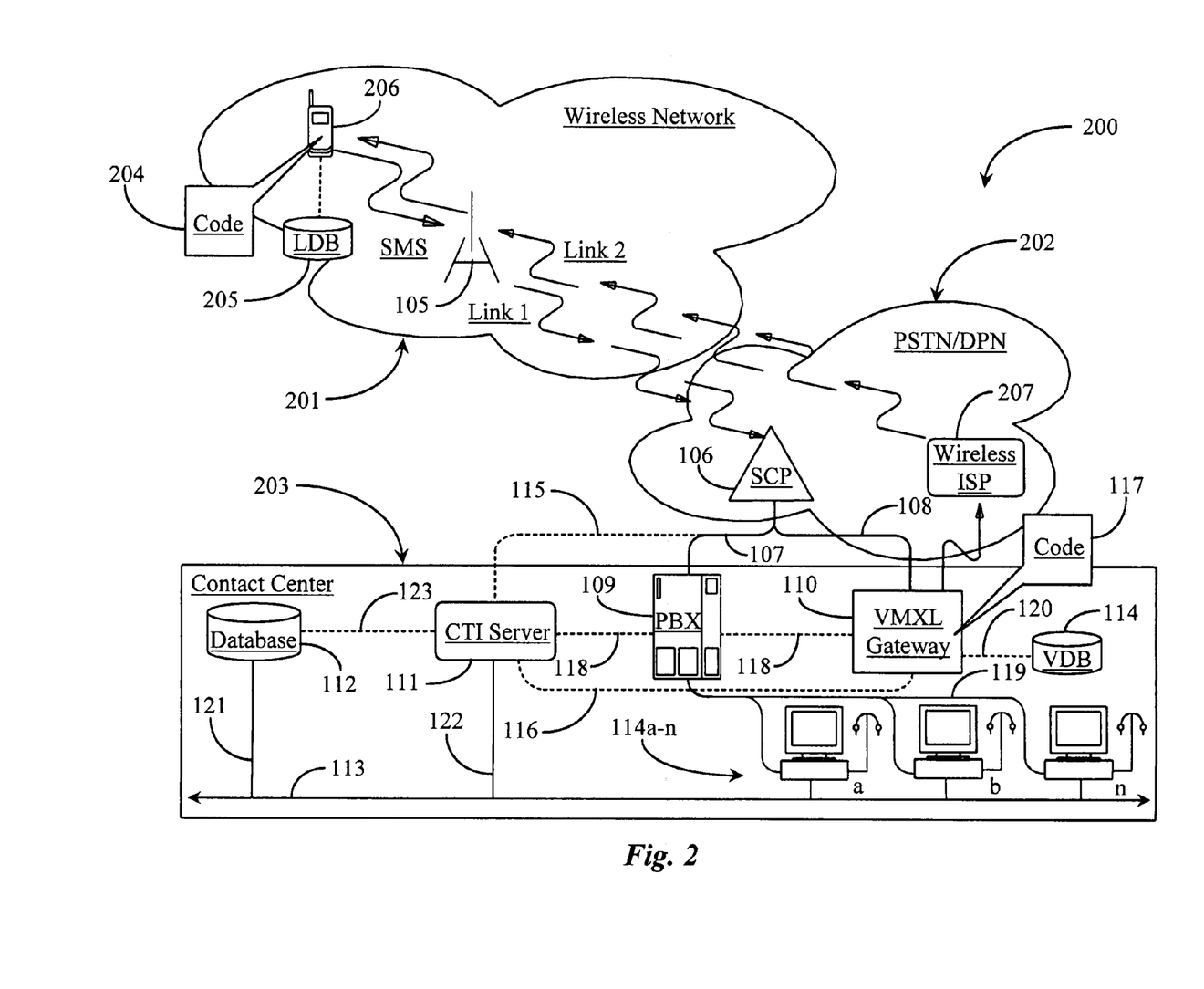
FIG. 2 is an overview of a communication environment practicing VXML distribution according to an embodiment of the present invention.

FIG. 2 is an overview 200 of a communication environment practicing VXML distribution according to an embodiment of the present invention. Environ 200, like that of environ 100 contains many common elements. Essentially, it may be the same overall architecture presented in FIG. 1 but where certain components thereof are enhanced for practicing the present invention.

A wireless network 201 is illustrated in this example and may be considered analogous to network 101 described above. A PSTN/data-packet-network (DPN) is illustrated in this example as PSTN/DPN 202 for convenience in illustration. One with skill in the art of networks will appreciate the geographic ambiguity between physical lines carrying both packet data (DPN) and switched data (COST) in respective connection oriented and packet driven networks. Therefore, it may be assumed that network 202 may exhibit COST connections, lines, and switching equipment as well as shared bandwidth connections, lines, and routing nodes typically associated with such as the Internet. In actual practice, telephony may be propagated from one network into the other including propagation from and into wireless networks without departing from the spirit and scope of the present invention. The appropriate gateways, network bridges, routers, and other network bridging nodes may be assumed present in this example.

A contact center 203 may be assumed analogous to contact center 103 described above, except that gateway 110 is adapted for Internet communication and to serve VXML applets to client devices for execution on those devices. VXML applets are downloadable executables that play certain sections of a voice application on the client device instead of using the resource cached at the gateway itself.

A cellular telephone 206, in this embodiment has a local database (LDB) 205 associated therewith. LDB 205 may reside on telephone 206 or may be connected to telephone 206 by a data link. Telephone 206 may be any network capable telephony device that is capable of establishing a normal telephone connection and a data network connection. In this embodiment, telephone 206 operates in a wireless mode, however in some embodiments, telephone 206 may be a stationary Internet protocol (IP) telephone tethered to a wired network such as an Ethernet network for example.

LDB 205 is supported by sufficient memory in order to practice the present invention. One with skill in the art will recognize that state-of-art hand-held cellular telephones may have up to 1 full gigabyte of memory space reserved for multimedia applications and associated media and the like. These are termed "bleeding edge" devices in the art and will become more prevalent in the art over the near term.

Telephone 206 has executable code 204 downloaded thereto and adapted for local execution for the purpose of presenting one or more VXML voice menus of a voice application, which may have been previously downloaded to telephone 206 from VXML gateway 110. In one embodiment, such code and VXML media capabilities may be stored on LDB 205 and linked to certain telephone numbers also stored on telephone 206. In this embodiment, when a user operating telephone 206 selects a telephone number to dial, if the number is linked to executable code and media then some or all of that functionality may be played locally on device 206 instead of requiring a persistent telephony connection to VXML gateway 110 in order to interact.

In practice of the present invention, a goal is to offload some of the required work performed by VXML gateway 110 to the client device. When multiplied by many accessing clients, a significant amount of workload may be thus distributed saving time and bandwidth, and alleviating congestion over telephony trunks 107 and 108.

In one embodiment, the user operating telephone 206 may place a normal telephone call into center 203 wherein the call is handled by SCP 106 as was described with reference to FIG. 1 above. If for some reason there is too much wait time due to congestion and it is found that there is VXML code and media stored locally then the user may interact with the local menu while waiting in queue. The interactive results may be propagated, in one embodiment as call control data over logical link 115 without actually connecting the caller to either VXML gateway 110 or to PBX 109. In addition, if there is an update to code 204, or there is some other VXML code available, a callback link may be established back to device 206 from VXML gateway 110 over a network channel while the user is still connected to SCP 106.

In this example, telephone 206 is connected to SCP 106 using a wireless cellular telephony channel illustrated herein as Link 1. Telephone 206 is also connected to VXML gateway 110 through a wireless Internet service provider (ISP) 207, which may be the same provided of the user's cellular services. This connection is a data network connection and is illustrated in the present embodiment as Link 2. Therefore, on link 1 the user is attempting to access center 203 while on link 2 the user may be downloading VXML code to execute a menu offsite. In this way, a persistent bi-directional telephony connection is not required in order to further the user's goal related to the initial telephone call.

In one example, the user operating telephone 206 may be calling a frequently used airline during a period when there is a bottleneck between SCP 106 and center 203. When the user selects the number on telephone 206 to dial, the client device finds associated VXML code 204 linked to the number. The user may begin interacting with a VXML menu immediately while dialing and while waiting in queue at SCP 106 for an open line. Resulting data from interaction may be propagated as a type of call control data using link 115 without significantly increasing call congestion. The inventor knows of hybrid CTI-XML formats available in the art that may be used, for example, (Call Control XML) or (Telera™ XML). In one embodiment, the telephone number dialed may also include a call-back preference media option like an instant message (IM), a simple message system (SMS) message, or an email for example. VXML code may be provided as XML data, wireless access protocol (WAP) data or in other well-known or newly devised network formats.

Call control data including result parameters and caller identification, perhaps even caller queue number may be processed in CTI server 111 and a call back may be initiated by CTI server 111 using VXML gateway 110 in order to establish a separate data connection to the user so that additional VXML code may be sent to the user over the separate link, in this case, link 2. In some cases, the VXML code may include result data that may satisfy the reason for the initial call (Link 1) thus enabling the user to disconnect from SCP 106. If many users can be serviced without actually routing their calls over trunks 107 or 108, then the call load for the congested telephony path may be reduced.

In an embodiment wherein VXML gateway 110 is the primary or default service point after SCP 106, then transfer to PBX 109 can be immediate by default if no VXML enhancement is associated locally or at the service. More detail about possible interaction methods is provided below.

Figure 3:
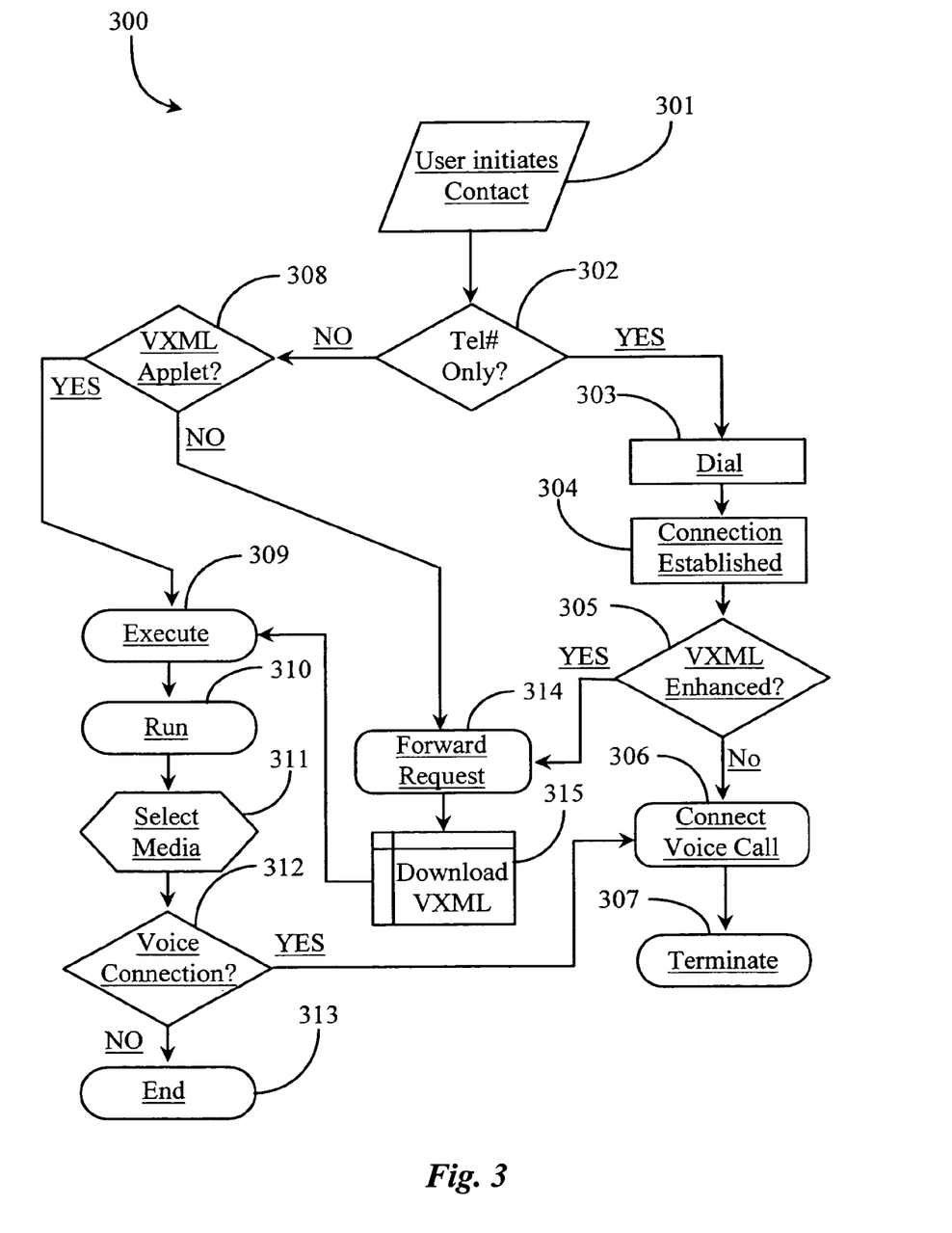
FIG. 3 is a process flow diagram illustrating steps for VXML client-side processing according to embodiments of the present invention.

FIG. 3 is a process flow diagram 300 illustrating steps for VXML client-side processing and interaction according to embodiments of the present invention. At step 301, a user operating a telephony device analogous to device 206 of FIG. 2 initiates contact. In this step, the user navigates to and selects a telephone number to dial as is typically practiced using such telephones. At step 302, the users' device determines whether the selection made is just a telephone voice number or whether there is any VXML enhancement associated with the telephone number.

Assuming that the number is not associated with any enhanced VXML code at step 302, the device dials the number at step 303 as is normally accomplished. At step 304, a connection is established with a destination service point or with an automated queue associated with the destination analogous to SCP 106. At step 305, it is determined by the service whether the number is in fact VXML enhanced at the service end or not. In this case, the device of step 302 does not know of any enhancement, but the queue system, analogous to a queuing system in SCP 106 of FIG. 2, for example, may have knowledge of a VXML enhancement associated with the particular destination number. It may be that such enhancement was implemented some time after the last call made to the service by the caller.

In step 305, if the service does not detect any VXML enhancement, then at step 306 the voice call is connected, most probably, to a live agent through a PBX when one becomes available. In the just described scenario, the particular number called is not associated with any VXML functionality at the user's device and further, may not be serviced by a VXML gateway at the destination called. Therefore, a voice call may be connected as in normally practiced and that call may then be terminated when the caller goal is satisfied at step 307.

If at step 305, the service determines that indeed there is available VXML enhancement associated with the destination number called, then at step 314 an automated request (call control data) may be forwarded, perhaps from the queuing system (SCP 106), to a CTI implement analogous to CTI server 111 of FIG. 2. The request may be control data that identifies the particular VXML code associated with the destination number and that also contains the caller's device parameters including caller identification, caller number, and any caller contact information that may be used to contact the caller over a separate data or media channel such as an Internet link. The request may be forwarded to VXML gateway/Server from the CTI system and the VXML gateway may then generate an automated message containing the VXML code, including updated content identified as an attachment. Such content may be XML description that is converted to a synthesized voice interaction menu at the caller's device after download.

During step 314, the caller is not connected to a live agent via a PBX, nor is the caller physically connected to a VXML gateway. Rather, the caller is still waiting in queue on the normal voice channel. At step 315, the VXML gateway uses a messaging program or some other vehicle capable of propagating code or making code available as an attachment to make the code available to the caller over the Internet for example. The VXML gateway analogous to gateway 110 of FIG. 2 may have a persistent network connection to the Internet wherein the connection is entirely hosted by or, in some cases, co-sponsored by the caller's wireless service.

It is important to note herein that the exact vehicle used to get the code to the caller's device may vary widely. For example, in one embodiment, the caller simply receives an IM, simple messaging service (SMS) message, or an email message containing the code as an attachment, or perhaps a hyperlink to a server where the code is available for download. In another embodiment, the caller may browse to a predetermined Web site where the caller has an inbox that may contain the code. In still another embodiment, the caller may navigate to an FTP site in order to download the code. In still a further embodiment, the caller's wireless service provider may handle the code in a seamless manner wherein the provider downloads the code for the caller in the background, over the wireless voice channel and installs it on the caller's device without requiring any action from the caller. In this embodiment, the caller may have appropriate client software installed and may subscribe to the capability from his or her wireless provider.

At step 315 then, the code is downloaded to the caller device, analogous to device 206 over a link analogous to Link 2 of FIG. 2 above. At step 309, the code may be automatically executed and may assume a state of run at step 310. Optionally, a step 311 may be included that enables the caller to select from a variety of media options for further interaction if necessary. For example, an audio VXML menu may be played on a media application, or an interactive text menu may be displayed on the user interface of the device. In any case, at step 311, the interaction ensues whether it is of the form of audio or visual text. For audio interaction on the local device, the device may be assumed to support content presentation using TTS and ASR. However, for some devices in other embodiments a text interactive applet may be provided instead of one that uses synthesized voice and speech recognition.

At step 312 the caller may decide, at some point during offsite interaction, whether there is still a requirement to remain connected over the voice channel to the service. This option may be provided as part of the interactive menu. For example, the code may contain the information that the caller sought to gain from initiating the call. If so, the caller may elect no to a voice connection option presented during interaction (step 312). If so the caller may end all connections at step 313.

If at step 308 the caller's device finds the required VXML code for offsite interaction, then at step 309 it is automatically executed and steps 310, 311, and 312 may occur as previously described. At step 312, if a voice connection is required then the caller's device, if not already connected to a queue, may dial the telephone number to initiate a voice connection. In this case, the caller may have interacted with the VXML applet of step 308 before his or her device even dials the associated telephone number. If through such interaction and interpretation of the results of the interaction, a voice connection is required, then step 312 may include initiating the call. At step 306 the voice connection may be established as previously described and wherein at step 307 after the caller's goal is satisfied, the voice call may be terminated.

In another embodiment, the telephone number is dialed regardless of whether a VXML code is found or not at step 302. At step 308, it is assumed that the telephone number selected is VXML enhanced and not just a telephone number. However, under this assumption, it is still possible that the required VXML code is not present on the user's device for any number of reasons. Perhaps the user has mistakenly deleted previously downloaded code. Perhaps, the previously downloaded code is not up to date, wherein the state of relevancy is determinable by the user's device against a pre-configured timetable. For example, a VXML code may be, in some cases, periodically updated to provide new function and data, for example, a voice interactive tidal chart or movie listing, or some other time-based information. If this period is fairly predictable, the user's device may, upon determining non-relevancy of the existing code, initiate an automatic connection to the code source, or gateway 110 (FIG. 2) at step 314 and may then download the updated VXML code at step 315. Automatic dialing may be performed by default for all of the above-described scenarios.

One with skill in the art will recognize that steps 314 and 315 may also occur, in some cases, as part of a code updating service and may execute and run in the background while a user operates device 206. Likewise code may be located and downloaded after a call connection is established or before an actual telephone number is dialed if there is a persistent online capability. There are many possible sequences.

In one embodiment, if VXML code or an update to existing local code is required, then the VXML server may receive a request at step 314, but may simply provide a universal resource locator (URL) in an email, or instant message describing where the code may be obtained using a browser application. That is to say that the actual code may be delivered via a push model or a pull model depending on configuration. Moreover, the messaging may take place over a same or separate connection between the device and the network. There are many possibilities depending on configuration and device type scenario.

Figure 4A:
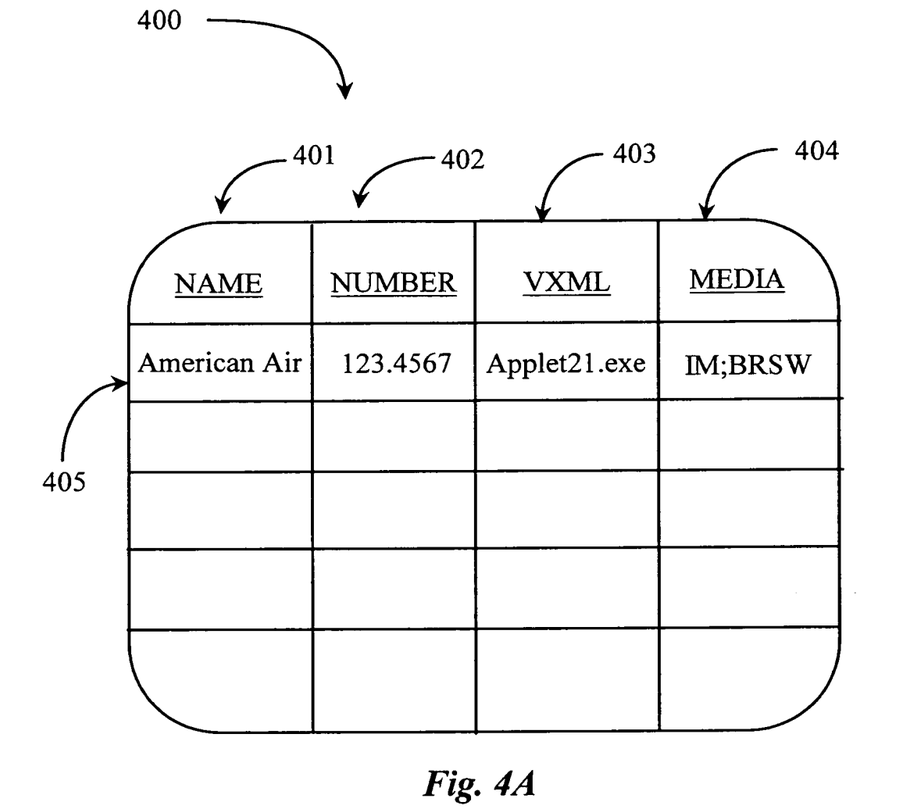
FIG. 4A is a plan view of a client-device telephone directory according to an embodiment of the present invention.

FIG. 4A is a plan view 400 of a client-device telephone directory according to an embodiment of the present invention. View 400 represents a simple exemplary contact list or telephone book that might be installed on a user's device analogous to device 206 of FIG. 2 above. Telephone book 400 is illustrated as a presentation of columns and rows, which may be viewed on a user display screen of the host device. Book 400 has a column 401 labeled NAME that lists contact names. Book 400 has a column 402 labeled NUMBER that lists contact numbers, in this case a telephone number. In a preferred embodiment, book 400 has a column 403 labeled VXML that lists any VXML applets that may be stored on the host device or in a connected storage. Also in a preferred embodiment, a column 404 labeled MEDIA is provided within book 400 and lists any media options available for communication or for receiving any additional VXML code. It is noted that there may also be additional columns for presenting other contact information such as Website, email address, physical address, and so on.

A telephone book contact record 405 is illustrated in the first row of book 400 and contains entries under all of the mentioned columns. For example, the contact name for record 405 is American Air. The telephone number for American Air is 123.4567. Record 405 is, in this case, associated with VXML enhancement and lists a VXML applet (applet21.exe) that is presumably stored locally on the host device or in an accessible local storage as described above. Applet21.exe may be manually or automatically executed when a user selects record 405 in order to initiate contact. In this case, voice application functionality may be executed and run on the users' local device without requiring a physical connection to a VXML gateway. The user may verbally or textually interact with the played offering and the interaction results may be saved. Such offsite interaction may occur at any time before, during, or post establishment of a connection to the contact telephone number.

The media choices illustrated in column 404 are IM and BRSW (browser software). These media or channel options enable a caller interacting with VXML to order a method of communication with the contact center. In one embodiment, media channels may be selected for specifying how a VXML server or gateway will deliver updates to existing VXML code or new VXML code that replaces the older existing code. For example, while dialing the contact American Air, which may be an airline service, for example, the caller may interact with VXML content executed by applet21, which was originally provided by the enterprise hosting the contact. The interaction includes code for synthesizing audio content, which may be an interactive audio menu containing options for the caller to select. Those options are saved when selected and may be uploaded to the service over the impending telephone connection or over a selected media channel supported.

In one embodiment of the present invention, an additional user interface UI may be provided to run on the caller's device for a caller to select media and or channel preferences for alternate contact callback requests in an event that a voice connection is not, at the time, feasible because of agent status including long waits in queues.

Figure 4B:
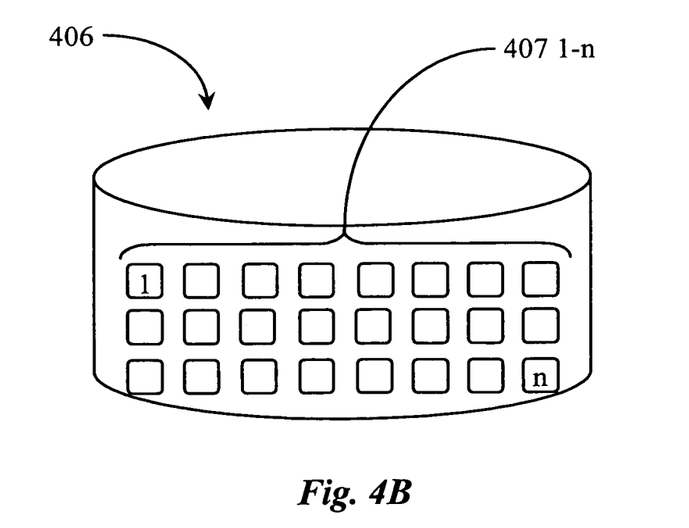
FIG. 4B is a block diagram illustrating locally cached VXML applets according to an embodiment of the present invention.

FIG. 4B is a block diagram 406 illustrating locally cached VXML applets according to an embodiment of the present invention. Diagram 406 is representative of a database or storage facility available to a host device analogous to device 206 of FIG. 2. Storage facility 406 may be provided internally to the device or may be accessible to the device via data link or local network link. Storage facility 406 is adapted to contain VXML applets 407 *1-n*, which are associated by reference or pointer to the appropriate contacts in telephone book 400 described above.

Each VXML applet contains coding for executing and running associated VXML content, which may include audio content, video content, and or textual content. In one embodiment, pre-recorded and compressed media files may be included as part of a VXML applet wherein the applet code executes the pre-recorded content locally on the user's device. In another embodiment, the code contains description of the content wherein TTS technology is used to recreate the voice portion of the content. ARS technology may be used to record and save a caller's responses as VXML result data when the caller executes and interacts with the local content. In one embodiment, VXML content may be downloaded separately from executable code or the code may be used to play content stored at a third-party location (server) that is still considered an offsite location.

One with skill in the art will appreciate that distributed VXML functionality spread over a large number of callers may result in a much reduced call load for a VXML gateway for any given period of time. The reduction of workload for the VXML gateway may also result in less pressure for live agents handling calls through a PBX system as VXML resources become more available. Offsite call screening using VXML distributed content may also result in an increase of the number of calls waiting in queue that may be satisfied without requiring a PBX or VXML gateway connection.

The methods and apparatus of the invention may be practiced in conjunction with wireless and/or wired networks including the Internet and other available data networks such as Ethernet networks without departing from the spirit and scope of the present invention. The method and apparatus of the present invention may be practiced using some of or all of the described components without departing from the spirit and scope of the present invention. For example, a caller may use a stationary IP telephone connected to an Ethernet network with a persistent IP connection. Likewise, a caller may initiate a call on one device wherein code is accessed and played on a peripheral device connected to the caller's device. There are a variety of possible architectures both at the client's end and at the service end.

Due to the many possible embodiments of the present invention many of which have been described herein, the present invention should be afforded the broadest possible scope. The spirit and scope of the present invention should be limited only by the following claims.

What is claimed is:

1. In a system for interacting with voice extensible markup language application content, the system including a content source node, a communication device, and a software interface running on the communication device, a method for acquiring and executing voice extensible markup language code for offsite local interaction comprising steps for;
    (a) selecting a telephone contact number from a contact list available to the communication device;
    (b) dialing the contact number;
    (c) establishing a connection between the communication device and a service point servicing the destination of the number;
    (d) determining at the service point the presence of voice extensible markup language capability associated with the destination number dialed;
    (e) forwarding a request from the service point to the content source node, the request to render the code associated with the destination number available to the caller;
    (f) forwarding the code to the communication device; and
    (g) executing the code from the communication device.

2. The method of claim 1, wherein in step (a), the communication device is one of a cellular telephone.

3. The method of claim 1, wherein in step (c), the connection established is a wireless connection from the point of the communication device and the service point is a service control point in a PSTN network.

4. The method of claim 1, wherein in step (d) the presence determination points to at least one voice extensible markup language executable code set stored at the content source node and associated with the destination number.

5. The method of claim 1, wherein in step (e) the request is of the form of call control data formatted as a command including description of media channel to be used in rendering.

6. The method of claim 1, wherein in step (f) the code is sent as a message attachment to the caller over a data connection.

7. The method of claim 1, wherein in step (f) the code is delivered to a specified inbox maintained by the caller.

8. The method of claim 1, wherein in step (f) a link to the code is delivered to the caller in one of an instant message, a simple messaging service message, or in an electronic mail message.

9. The method of claim 1, wherein in step (f) the code is delivered transparently to the communication device over an Internet connection.

10. In a system for interacting with voice extensible markup language application content, the system including a content source node, a communication device, and a software interface running on the communication device, a method for interacting with application content offsite comprising steps for;
    (a) selecting a telephone contact number from a contact list available to the communication device;
    (b) determining the presence of locally stored voice extensible markup language code associated with the selected contact number;
    (c) executing the code; and
    (d) interacting with content played by the code.

11. The method of claim 10 wherein in step (a), the communication device is one of a cellular telephone.

12. The method of claim 10 wherein in step (b), the method of association is a pointer to a database entry in a local database.

13. The method of claim 10 wherein in step (c), the communication device executes the code automatically.

14. The method of claim 10 wherein in step (a), a simultaneous step for dialing the number is initiated.

15. The method of claim 10 wherein in step (d), the content is text that is rendered on the communication device as synthesized voice using text to speech technology.

16. The method of claim 10 wherein in step (d), the content is pre-recorded audio stored on the communication device.

17. The method of claim 10 wherein in step (d), the content is stored in a repository accessible to the communication device on a local network.

18. The method of claim 10 wherein in step (d), the content is stored in a repository accessible to the communication device on a wide area network.

* * * * *